US012358279B2

(12) United States Patent
Usui

(10) Patent No.: US 12,358,279 B2
(45) Date of Patent: Jul. 15, 2025

(54) LIQUID EJECTING APPARATUS

(71) Applicant: SEIKO EPSON CORPORATION, Tokyo (JP)

(72) Inventor: Toshiki Usui, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 279 days.

(21) Appl. No.: 18/192,754

(22) Filed: Mar. 30, 2023

(65) Prior Publication Data

US 2023/0311488 A1 Oct. 5, 2023

(30) Foreign Application Priority Data

Mar. 31, 2022 (JP) ................................ 2022-058937

(51) Int. Cl.
*B41J 2/045* (2006.01)

(52) U.S. Cl.
CPC ....... *B41J 2/04541* (2013.01); *B41J 2/04581* (2013.01); *B41J 2/04588* (2013.01)

(58) Field of Classification Search
CPC B41J 2/04553; B41J 2/04541; B41J 2/04581; B41J 2/04588
See application file for complete search history.

(56) References Cited

U.S. PATENT DOCUMENTS

2011/0316915 A1* 12/2011 Matsushita .......... B41J 2/04553 347/10

FOREIGN PATENT DOCUMENTS

JP 2009-090467 A 4/2009

* cited by examiner

*Primary Examiner* — Lam S Nguyen
(74) *Attorney, Agent, or Firm* — Harness, Dickey & Pierce, P.L.C.

(57) ABSTRACT

A liquid ejecting apparatus performs gradation expression with multiple gradation levels by ejecting liquid droplets onto a medium. In the liquid ejecting apparatus, a period in which a first drive circuit outputs a second drive waveform as a first drive signal at least partially overlaps a period in which a second drive circuit outputs a fourth drive waveform as a second drive signal; a period in which the first drive circuit outputs a third drive waveform as the first drive signal does not overlap the period in which the second drive circuit outputs the fourth drive waveform as the second drive signal; and in a drive cycle, the first drive circuit outputs a first drive waveform as the first drive signal, subsequently outputs the second drive waveform as the first drive signal, and then outputs the third drive waveform as the first drive signal.

5 Claims, 9 Drawing Sheets

| [SIH, SIM, SIL] | S1 | | | S2 | |
|---|---|---|---|---|---|
| | ta1 | ta2 | ta3 | tb1 | tb2 |
| [1, 1, 1] (LL) | H | H | H | L | L |
| [0, 1, 1] (L) | L | H | H | L | L |
| [0, 1, 0] (M) | L | H | L | L | L |
| [0, 0, 1] (S) | L | L | L | H | L |
| [0, 0, 0] (BSD) | L | L | L | L | H |

LIQUID EJECTING APPARATUS

The present application is based on, and claims priority from JP Application Serial Number 2022-058937, filed Mar. 31, 2022, the disclosure of which is hereby incorporated by reference herein in its entirety.

BACKGROUND

1. Technical Field

The present disclosure relates to a liquid ejecting apparatus.

2. Related Art

A known liquid ejecting apparatus for forming images and documents on media includes driven elements, such as piezoelectric elements. Such a liquid ejecting apparatus includes a driven element for each of multiple nozzles that eject liquid droplets, and the driven element is driven according to a drive signal to cause the corresponding nozzle to eject a liquid droplet.

For example, JP-A-2009-090467 describes a liquid ejecting apparatus including a drive signal generation unit that generates a drive signal for driving a piezoelectric element used as a driven element. The drive signal generated by the drive signal generation unit is supplied to the piezoelectric element to eject a liquid droplet.

Along with the recent improvement in the ejection accuracy of liquid droplets, the technology for forming very fine liquid droplets has progressed. However, when a liquid droplet is ejected from a nozzle, a phenomenon in which the rear end of the liquid droplet stretches like a tail occurs. For this reason, to eject a very fine liquid droplet, the signal waveform of a drive signal becomes complex. As a result, when a liquid ejecting apparatus ejects a very fine liquid droplet, power consumption increases instantaneously. JP-A-2009-090467 includes no description about such an instantaneous increase in power consumption and therefore has room for improvement.

SUMMARY

According to an aspect of the present disclosure, a liquid ejecting apparatus performs gradation expression with multiple gradation levels by ejecting liquid droplets onto a medium and includes a first drive circuit that outputs a first drive signal; a second drive circuit that outputs a second drive signal; an ejection unit that ejects a liquid in response to receiving at least one of the first drive signal and the second drive signal; and a power circuit that supplies power to the first drive circuit and the second drive circuit. The first drive signal includes a first drive waveform, a second drive waveform, and a third drive waveform in a drive cycle; the second drive signal includes a fourth drive waveform and a fifth drive waveform in the drive cycle; when receiving the first drive waveform, the ejection unit ejects a liquid droplet with a first droplet volume; when receiving the second drive waveform, the ejection unit ejects a liquid droplet with a second droplet volume; when receiving the third drive waveform, the ejection unit ejects a liquid droplet with a third droplet volume; when receiving the fourth drive waveform, the ejection unit ejects a liquid droplet with a fourth droplet volume; when receiving the fifth drive waveform, the ejection unit ejects no liquid droplet; the fourth droplet volume is less than the first droplet volume, the second droplet volume, and the third droplet volume; the third droplet volume is less than the first droplet volume and the second droplet volume; a first gradation level in the multiple gradation levels is expressed by using only the fourth drive waveform; a second gradation level in the multiple gradation levels is expressed by using at least the second drive waveform and without using the first drive waveform and the fourth drive waveform; a third gradation level in the multiple gradation levels is expressed by using at least the first drive waveform and without using the fourth drive waveform; a brightness value of the second gradation level is lower than a brightness value of the first gradation level; a brightness value of the third gradation level is lower than the brightness value of the second gradation level; a period in which the first drive circuit outputs the second drive waveform as the first drive signal at least partially overlaps a period in which the second drive circuit outputs the fourth drive waveform as the second drive signal; a period in which the first drive circuit outputs the third drive waveform as the first drive signal does not overlap the period in which the second drive circuit outputs the fourth drive waveform as the second drive signal; and in the drive cycle, the first drive circuit outputs the first drive waveform as the first drive signal, subsequently outputs the second drive waveform as the first drive signal, and then outputs the third drive waveform as the first drive signal.

DESCRIPTION OF EXEMPLARY EMBODIMENTS

An embodiment of the present disclosure is described below with reference to the drawings. The drawings are just for descriptive purposes. The embodiment described below does not unduly limit the scope of the present disclosure described in the claims. Also, not all of the configurations described below are necessarily essential components of the present disclosure.

In the descriptions below, a consumer ink jet printer is used as an example of a liquid ejecting apparatus according to the present disclosure. However, the liquid ejecting apparatus is not limited to a consumer ink jet printer and may also be a textile printer that performs textile printing or an office multifunction printer. Furthermore, the liquid ejecting apparatus is not limited to a printer, but may also be, for example, a color material ejecting apparatus used to manufacture a color filter for a liquid crystal display, an electrode material ejecting apparatus used to form electrodes for an organic electroluminescent (EL) display and a surface-emitting display, or a bioorganic material ejecting apparatus used to manufacture a biochip.

1. Configuration of Liquid Ejecting Apparatus

Figure 1:
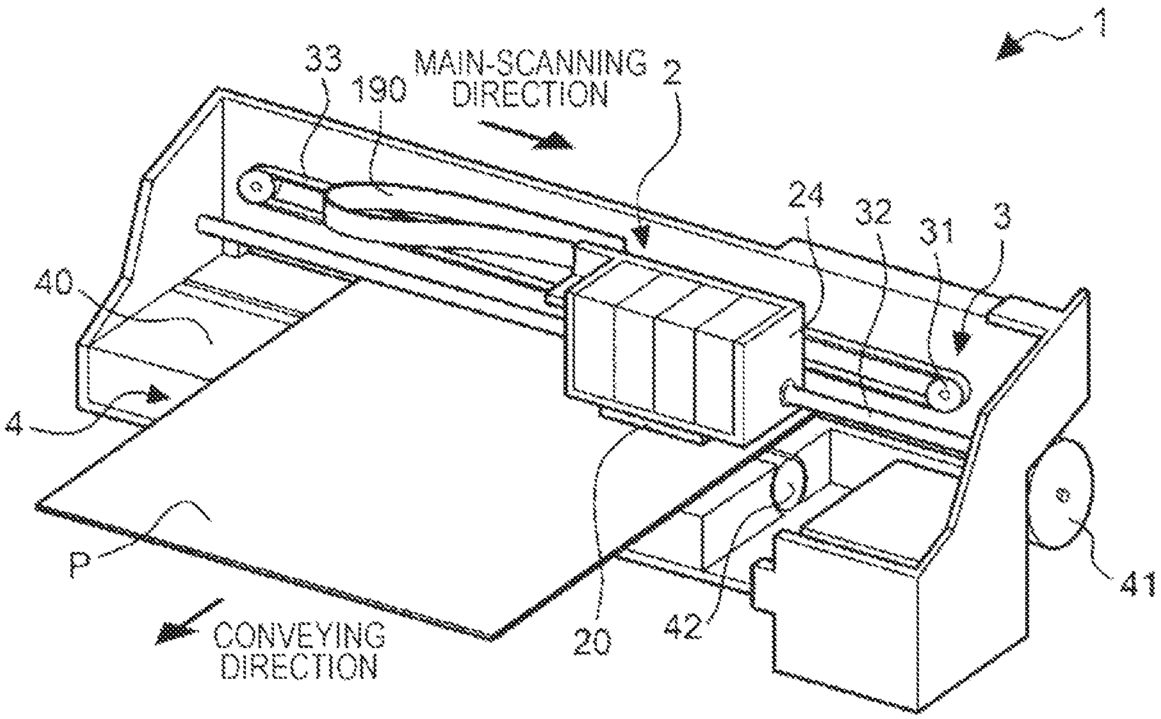
FIG. 1 is a drawing illustrating an example of a configuration of a liquid ejecting apparatus.

FIG. 1 is a drawing illustrating an example of a configuration of a liquid ejecting apparatus 1. As illustrated in FIG. 1, the liquid ejecting apparatus 1 includes a movable body 2 and a moving unit 3 that moves the movable body 2 back and forth along a main-scanning direction.

The moving unit 3 includes a carriage motor 31 that is a drive source for moving the movable body 2 back and forth along the main-scanning direction, a carriage guide shaft 32 both ends of which are fixed, and a timing belt 33 that extends substantially parallel to the carriage guide shaft 32 and is driven by the carriage motor 31.

The movable body 2 includes a carriage 24. The carriage 24 is supported by the carriage guide shaft 32 so as to be movable back and forth and is fixed to a part of the timing belt 33. When the timing belt 33 is rotated forward and backward by the carriage motor 31, the movable body 2 including the carriage 24 is guided by the carriage guide shaft 32 to move back and forth. A head unit 20 is disposed on a part of the movable body 2 that faces a medium P. That is, the head unit 20 is mounted on the carriage 24. Multiple nozzles for ejecting ink as liquid droplets are disposed on a side of the head unit 20 that faces the medium P. Various control signals for controlling the operation of the head unit 20 are supplied to the head unit 20 via a cable 190. The cable 190 may be implemented by, for example, a flexible flat cable that can slide along with the back-and-forth movement of the movable body 2.

The liquid ejecting apparatus 1 also includes a conveying unit 4 that conveys the medium P on a platen 40 along a conveying direction. The conveying unit 4 includes a conveying motor 41 that is a drive source for conveying the medium P and a conveyor roller 42 that is rotated by the conveying motor 41 to convey the medium P along the conveying direction.

In the liquid ejecting apparatus 1 configured as described above, the head unit 20 ejects ink onto the medium P in synchronization with the timing at which the medium P is conveyed by the conveying unit 4. As a result, the ink ejected by the head unit 20 lands on desired positions on the medium P, and a desired image or character is formed on the surface of the medium P.

Figure 2:
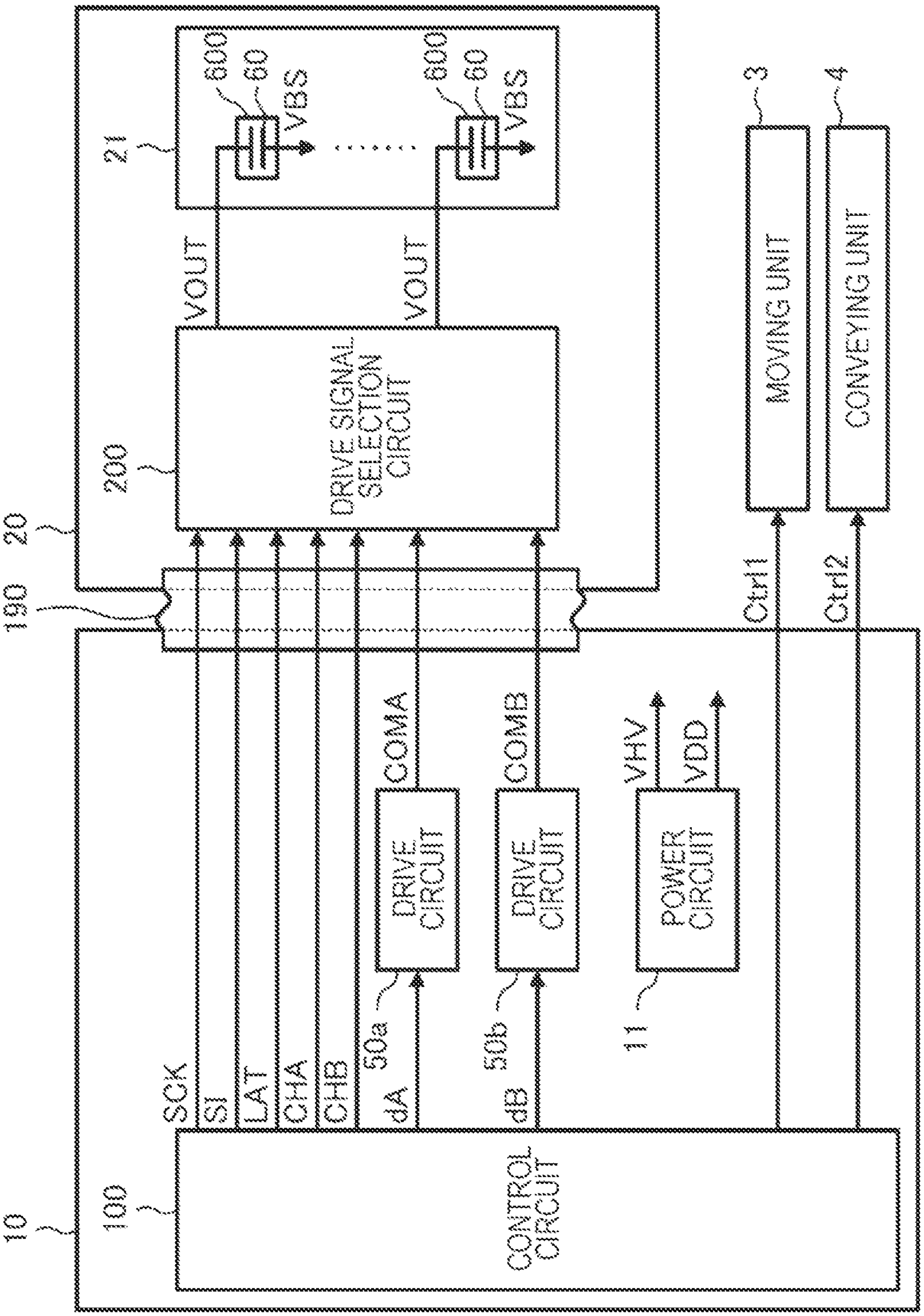
FIG. 2 is a drawing illustrating an example of a functional configuration of a liquid ejecting apparatus.

Next, a functional configuration of the liquid ejecting apparatus 1 is described. FIG. 2 is a drawing illustrating an example of a functional configuration of the liquid ejecting apparatus 1. As illustrated in FIG. 2, the liquid ejecting apparatus 1 includes a control unit 10, the head unit 20, the moving unit 3, the conveying unit 4, and the cable 190. The cable 190 electrically connects the control unit 10 to the head unit 20.

The control unit 10 includes a power circuit 11, a control circuit 100, and drive circuits 50*a* and 50*b*.

The power circuit 11 generates voltage signals VHV and VDD with predetermined voltage values from commercial alternating-current (AC) power supplied from the outside of the liquid ejecting apparatus 1 and outputs the voltage signals VHV and VDD to various components of the liquid ejecting apparatus 1. Here, for example, the voltage signal VHV and the voltage signal VDD output by the power circuit 11 are direct current (DC) voltages of 42 V and 3.3 V, respectively. The power circuit 11 may include, for example, an AC/DC converter that generates the voltage signal VHV from the commercial AC power and a DC/DC converter that generates the voltage signal VDD from the voltage signal VHV. The power circuit 11 may also output a DC voltage with a different voltage value in addition to the voltage signals VHV and VDD.

Image data is supplied to the control circuit 100 from, for example, an external device (not shown), such as a host computer, provided outside of the liquid ejecting apparatus 1. The control circuit 100 generates various control signals for controlling components of the liquid ejecting apparatus 1 by performing, for example, various types of image processing on the supplied image data and outputs the control signals to the corresponding components.

Specifically, the control circuit 100 generates a control signal Ctrl1 for controlling the back-and-forth movement of the movable body 2 and outputs the control signal Ctrl1 to the carriage motor 31 included in the moving unit 3. Also, the control circuit 100 generates a control signal Ctrl2 for controlling the conveyance of the medium P and outputs the control signal Ctrl2 to the conveying motor 41 included in the conveying unit 4. Thus, the back-and-forth movement of the movable body 2 along the main-scanning direction and the conveyance of the medium P along the conveying direction are controlled by the control circuit 100. This enables the head unit 20 to eject ink onto the medium P at a timing synchronized with the conveyance of the medium P. As a result, the ink lands on desired positions on the medium P, and a desired image or character can be formed on the medium P.

Alternatively, the control circuit 100 may supply the control signal Ctrl1 for controlling the back-and-forth movement of the movable body 2 via a carriage motor driver (not shown) to the moving unit 3. Similarly, the control circuit 100 may supply the control signal Ctrl2 for controlling the conveyance of the medium P via a conveying motor driver (not shown) to the conveying unit 4.

The control circuit 100 also outputs a base drive signal dA to the drive circuit 50*a*. The base drive signal dA includes data defining the signal waveform of the drive signal COMA and may be, for example, a digital signal. The drive circuit 50*a* operates using the voltage signals VHV and VDD output by the power circuit 11 as power-supply voltages. The drive circuit 50*a* converts the input digital base drive signal dA into an analog signal and then amplifies the analog signal to a voltage value based on the voltage signal VHV to generate the drive signal COMA. Then the drive circuit 50*a* supplies the generated drive signal COMA to the head unit 20.

The control circuit 100 also outputs a base drive signal dB to the drive circuit 50*b*. The base drive signal dB includes data defining the signal waveform of the drive signal COMB and is, for example, a digital signal. The drive circuit 50*b* operates using the voltage signals VHV and VDD output by the power circuit 11 as power-supply voltages. The drive circuit 50*b* converts the input digital base drive signal dB into an analog signal and amplifies the analog signal to a voltage value based on the voltage signal VHV to generate the drive signal COMB. Then, the drive circuit 50*b* supplies the generated drive signal COMB to the head unit 20.

The drive circuits 50*a* and 50*b* may be implemented by any similarly-configured circuits that operate based on the base drive signals dA and dB and are capable of amplifying the voltage values of the signal waveforms defined by the base drive signals dA and dB to the voltage based on the voltage signal VHV. For example, the drive circuits 50*a* and 50*b* may be implemented by various types of amplifier circuits including a class A amplifier circuit, a class B amplifier circuit, a class AB amplifier circuit, and a class D amplifier circuit.

The control circuit 100 also generates a clock signal SCK, a latch signal LAT, change signals CHA and CHB, and a print data signal SI for controlling the operation of the head unit 20 and outputs these signals to the head unit 20.

The head unit 20 includes a drive signal selection circuit 200 and a liquid ejection head 21. The liquid ejection head 21 includes multiple ejection units 600 each of which includes a piezoelectric element 60. In the descriptions below, it is assumed that the liquid ejection head 21 includes "n" ejection units 600.

The drive signal selection circuit 200 receives the clock signal SCK, the latch signal LAT, the change signals CHA and CHB, and the print data signal SI.

The drive signal selection circuit 200 generates a drive signal VOUT by selecting or deselecting signal waveforms in the drive signal COMA and the drive signal COMB based on the print data signal SI transmitted in synchronization with the clock signal SCK at timings specified by the latch signal LAT and the change signals CHA and CHB. Then, the drive signal selection circuit 200 supplies the generated drive signal VOUT to one end of the piezoelectric element 60 included in the corresponding one of the ejection units 600. Also, a reference voltage signal VBS is supplied to another end of the piezoelectric element 60 included in each of the multiple ejection units 600. The reference voltage signal VBS serves as a reference potential for driving the piezoelectric element 60 and has a constant potential of, for example, 5.5 V or 6 V. The piezoelectric element 60 is driven according to a potential difference between the drive signal VOUT supplied to the one end and the reference voltage signal VBS supplied to the other end. When the piezoelectric element 60 is driven, ink is ejected from the ejection unit 600 including the piezoelectric element 60.

In FIG. 2, the head unit 20 includes one liquid ejection head 21. However, the head unit 20 may include more than one liquid ejection heads 21 depending on the types and the number of inks to be ejected.

As described above, the liquid ejecting apparatus 1 of the present embodiment performs multi-gradation expression (gradation expression with multiple gradation levels) on the medium P by controlling the signal waveform of the drive signal VOUT supplied to each piezoelectric element 60 and thereby controlling the volume of each liquid droplet ejected onto the medium P, and includes the drive circuit 50*a* that outputs the drive signal COMA, the drive circuit 50*b* that outputs the drive signal COMB, the ejection units 600 each of which ejects a liquid in response to receiving at least one of the drive signal COMA and the drive signal COMB, and the power circuit 11 that supplies power to the drive circuit 50*a* and the drive circuit 50*b*.

2. Configuration and Operation of Ejection Unit

Figure 3:
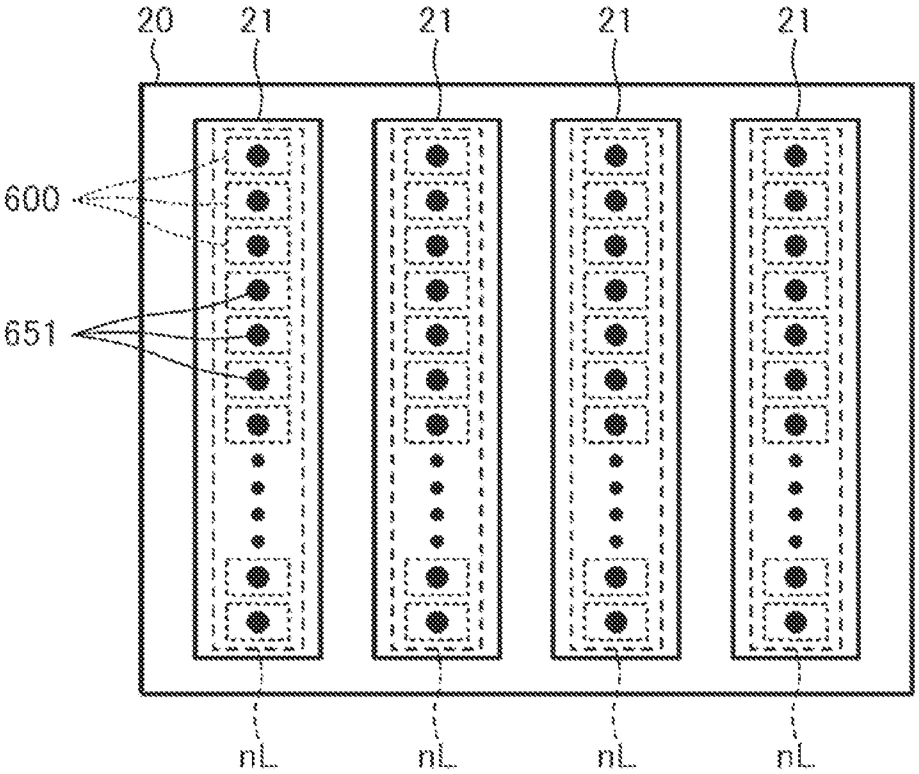
FIG. 3 is a drawing illustrating an example of an arrangement of multiple ejection units in a head unit.

Next, an example of an arrangement of multiple ejection units 600 in the head unit 20 and an example of a configuration of each of the multiple ejection units 600 included in the head unit 20 are described. FIG. 3 is a drawing illustrating an example of an arrangement of the multiple ejection units 600 in the head unit 20. In the example of FIG. 3, the head unit 20 includes four liquid ejection heads 21.

As illustrated in FIG. 3, each of the four liquid ejection heads 21 includes multiple ejection units 600 that are arranged in a row in one direction. In other words, each liquid ejection head 21 includes a nozzle array nL in which nozzles 651 (described later) included in the respective ejection units 600 are arranged in one direction. Also, the liquid ejection heads 21 are arranged in the head unit 20 in a direction intersecting the nozzle array nL. That is, the same number of nozzle arrays nL as the number of the liquid ejection heads 21 are formed in the head unit 20. Here, the nozzle array nL included in the liquid ejection head 21 is not necessarily formed by a single row of nozzles 651. For example, the nozzles 651 may be arranged in a staggered manner such that an even-numbered nozzle 651 counted from one end of an array of nozzles 651 and an odd-numbered nozzle 651 counted from the one end of the array of nozzles 651 are placed in different lateral positions. Also, one nozzle array nL may be formed by two or more rows of nozzles 651 arranged parallel to each other in the liquid ejection head 21.

Figure 4:
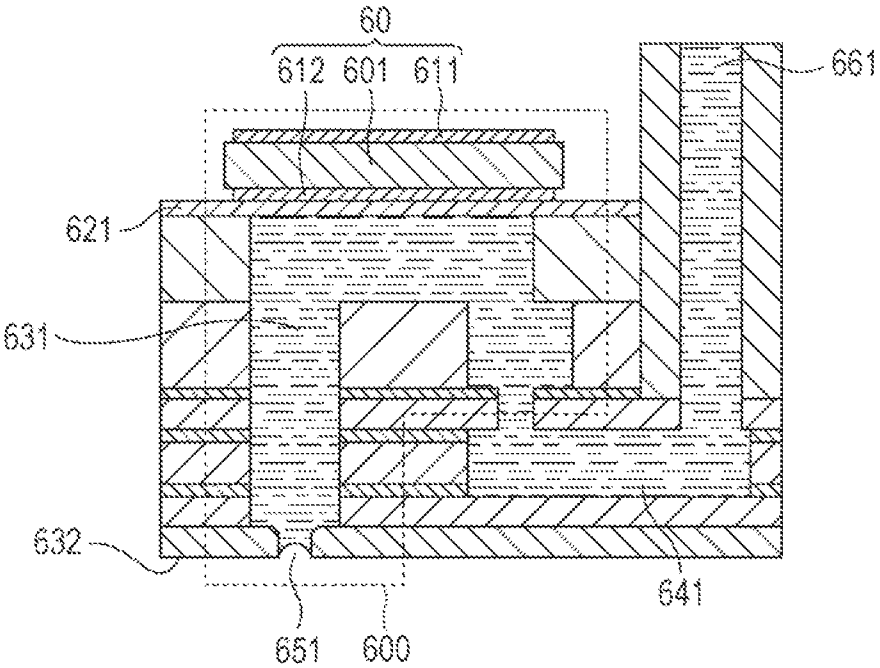
FIG. 4 is a drawing illustrating an example of a configuration of an ejection unit.

Next, an example of a configuration of the ejection unit 600 is described. FIG. 4 is a drawing illustrating an example of a configuration of the ejection unit 600. As illustrated in FIG. 4, the ejection unit 600 includes the piezoelectric element 60, a vibration plate 621, a cavity 631, and the nozzle 651. The vibration plate 621 is displaced when the piezoelectric element 60, which is provided on the upper surface of the vibration plate 621 in FIG. 4, is driven. The vibration plate 621 functions as a diaphragm that increases or decreases the internal volume of the cavity 631. The cavity 631 is filled with ink. The cavity 631 functions as a pressure chamber the internal volume of which changes when the piezoelectric element 60 is driven and the vibration plate 621 is displaced. The nozzle 651 is an opening that is formed in a nozzle plate 632 and communicates with the cavity 631. As the internal volume of the cavity 631 changes, the ink stored inside of the cavity 631 is ejected from the nozzle 651.

The piezoelectric element 60 has a configuration in which a piezoelectric body 601 is sandwiched between a pair of electrodes 611 and 612. With this configuration, the central portions of the piezoelectric body 601, the electrodes 611 and 612, and the vibration plate 621 warp in the vertical direction in FIG. 4 with respect to their end portions according to the potential difference between the electrodes 611 and 612.

Specifically, the drive signal VOUT is supplied to the electrode 611 that is one end of the piezoelectric element 60, and the reference voltage signal VBS is supplied to the electrode 612 that is another end of the piezoelectric element 60. When the piezoelectric element 60 is driven upward according to a change in the voltage value of the drive signal VOUT, the vibration plate 621 is displaced upward and as a result, the internal volume of the cavity 631 increases. Accordingly, the ink stored in a reservoir 641 is drawn into the cavity 631. In contrast, when the piezoelectric element 60 is driven downward according to a change in the voltage value of the drive signal VOUT, the vibration plate 621 is displaced downward and as a result, the internal volume of the cavity 631 decreases. As a result, an amount of ink corresponding to the decrease in the internal volume of the cavity 631 is ejected from the nozzle 651.

As described above, the liquid ejection head 21 includes the piezoelectric element 60 and ejects ink onto the medium P when the piezoelectric element 60 is driven. The configurations of the piezoelectric element 60 and the ejection unit 600 are not limited to those illustrated in FIG. 4, and the piezoelectric element 60 and the ejection unit 600 may have any configurations that can eject ink from the nozzle 651 according to the displacement of the piezoelectric element 60.

3. Signal Waveforms of Drive Signals COMA and COMB

Figure 5:
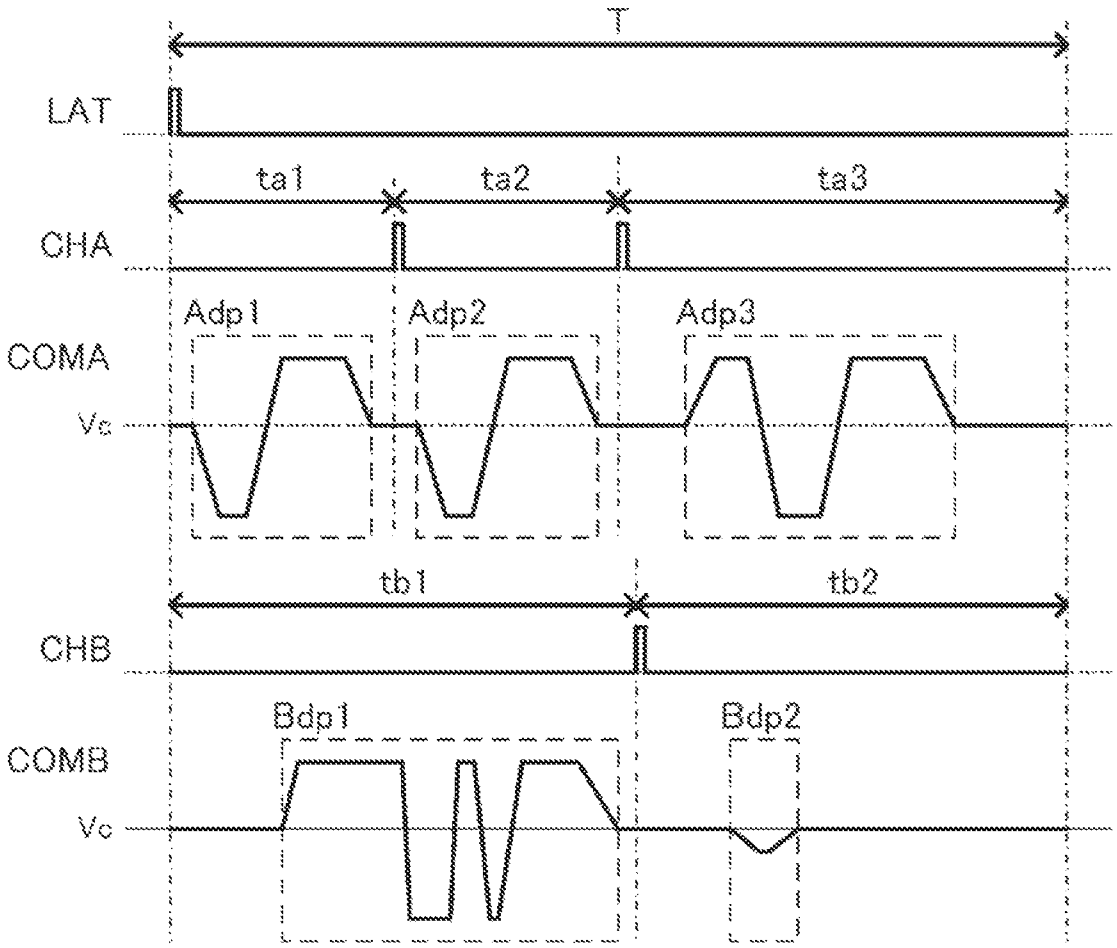
FIG. 5 is a drawing illustrating examples of signal waveforms of drive signals COMA and COMB.

Next, examples of signal waveforms of the drive signal COMA output by the drive circuit 50*a* and the drive signal COMB output by the drive circuit 50*b* are described. FIG. 5 is a drawing illustrating examples of signal waveforms of the drive signals COMA and COMB.

As illustrated in FIG. 5, the drive circuit 50*a* outputs the drive signal COMA including a trapezoidal waveform Adp1 placed in a period ta1 from the rise of the latch signal LAT to the rise of the change signal CHA, a trapezoidal waveform Adp2 placed in a period ta2 after the period ta1 until the next rise of the change signal CHA, and a trapezoidal waveform Adp3 placed in a period ta3 after the period ta2 until the next rise of the latch signal LAT. That is, the drive signal COMA includes the trapezoidal waveform Adp1, the trapezoidal waveform Adp2, and the trapezoidal waveform Adp3 in a cycle T including the periods ta1, ta2, and ta3.

When supplied to the electrode 612 of the piezoelectric element 60 of the ejection unit 600, the trapezoidal waveform Adp1 causes the ejection unit 600 to eject an amount of ink that is greater than a predetermined amount. In other words, when the trapezoidal waveform Adp1 is supplied to the ejection unit 600, the ejection unit 600 ejects an amount of ink that is greater than the predetermined amount. The trapezoidal waveform Adp1 starts at a voltage Vc, becomes lower than the voltage Vc, subsequently becomes higher than the voltage Vc, and then ends at the voltage Vc.

When supplied to the electrode 612 of the piezoelectric element 60 of the ejection unit 600, the trapezoidal waveform Adp2 causes the ejection unit 600 to eject an amount of ink that is greater than the predetermined amount. In other words, when the trapezoidal waveform Adp2 is supplied to the ejection unit 600, the ejection unit 600 ejects an amount of ink that is greater than the predetermined amount. The trapezoidal waveform Adp2 starts at the voltage Vc, becomes lower than the voltage Vc, subsequently becomes higher than the voltage Vc, and then ends at the voltage Vc.

When supplied to the electrode 612 of the piezoelectric element 60 of the ejection unit 600, the trapezoidal waveform Adp3 causes the ejection unit 600 to eject the predetermined amount of ink. In other words, when the trapezoidal waveform Adp3 is supplied to the ejection unit 600, the ejection unit 600 ejects the predetermined amount of ink. The trapezoidal waveform Adp3 starts at the voltage Vc, becomes higher than the voltage Vc, subsequently becomes lower than the voltage Vc, becomes higher than the voltage Vc again, and then ends at the voltage Vc. With the trapezoidal waveform Adp3, the voltage value is made higher than the voltage Vc, made lower than the voltage Vc, and then made higher than the voltage Vc again. This makes it possible to reduce the phenomenon in which the rear end of ink ejected from the nozzle 651 stretches like a tail. This also makes it possible to make the amount of ink ejected from the nozzle 651 when the trapezoidal waveform Adp3 is supplied to the electrode 612 of the piezoelectric element 60 less than the amount of ink ejected from the nozzle 651 when either one of the trapezoidal waveforms Adp1 and Adp2 is supplied to the electrode 612 of the piezoelectric element 60.

Here, the power consumption of the drive circuit 50*a* instantaneously increases when the voltage value of the output drive signal COMA changes. Therefore, the amount of power consumed when the trapezoidal waveform Adp3, the voltage value of which changes frequently, is supplied to the ejection unit 600 becomes greater than the amount of power consumed when the trapezoidal waveform Adp1 is supplied to the ejection unit 600 and the amount of power consumed when the trapezoidal waveform Adp2 is supplied to the ejection unit 600.

As described above, the drive circuit 50*a* outputs the trapezoidal waveform Adp1, subsequently outputs the trapezoidal waveform Adp2, and then outputs the trapezoidal waveform Adp3 as the drive signal COMA. Also, in the drive signal COMA output by the drive circuit 50*a*, all of the trapezoidal waveform Adp1, the trapezoidal waveform Adp2, and the trapezoidal waveform Adp3 start at the voltage Vc and end at the voltage Vc. That is, the drive signal COMA output by the drive circuit 50*a* includes a signal waveform in which the trapezoidal waveform Adp1, the trapezoidal waveform Adp2, the trapezoidal waveform Adp3, and the voltage Vc are arranged consecutively.

Also, as illustrated in FIG. 5, the drive circuit 50*b* outputs the drive signal COMB including a trapezoidal waveform Bdp1 placed in a period tb1 from the rise of the latch signal LAT to the rise of the change signal CHB and a trapezoidal waveform Bdp2 placed in a period tb2 after the period ta1 until the next rise of the latch signal LAT. That is, the drive signal COMB includes the trapezoidal waveform Bdp1 and the trapezoidal waveform Bdp2 in the cycle T including the periods tb1 and tb2.

When supplied to the electrode 612 of the piezoelectric element 60 of the ejection unit 600, the trapezoidal waveform Bdp1 causes the ejection unit 600 to eject an amount of ink less than the predetermined amount. In other words, when the trapezoidal waveform Bdp1 is supplied to the ejection unit 600, the ejection unit 600 ejects an amount of ink less than the predetermined amount. Accordingly, the amount of ink ejected from the ejection unit 600 when the trapezoidal waveform Bdp1 is supplied to the electrode 612 of the piezoelectric element 60 of the ejection unit 600 is less than the amount of ink ejected from the ejection unit 600 when any one of the trapezoidal waveforms Adp1, Adp2, and Adp3 is supplied to the electrode 612 of the piezoelectric element 60 of the ejection unit 600.

The trapezoidal waveform Bdp1 starts at the voltage Vc, becomes higher than the voltage Vc, subsequently becomes lower than the voltage Vc, and becomes higher than the voltage Vc again. After that, the trapezoidal waveform Bdp1 becomes lower than the voltage Vc again, becomes higher than the voltage Vc again, and then ends at the voltage Vc. That is, the trapezoidal waveform Bdp1 repeats a cycle of becoming higher than the voltage Vc, subsequently becoming lower than the voltage Vc, and again becoming higher than the voltage Vc multiple times at a predetermined frequency. This makes it possible to further reduce the phenomenon in which the rear end of ink ejected from the nozzle 651 stretches like a tail. This also makes it possible to make the amount of ink ejected from the nozzle 651 when the trapezoidal waveform Bdp1 is supplied to the electrode 612 of the piezoelectric element 60 less than the amount of ink ejected from the nozzle 651 when any one of the trapezoidal waveforms Adp1, Adp2, and Adp3 is supplied to the electrode 612 of the piezoelectric element 60. The amount of ink ejected from the nozzle 651 when the trapezoidal waveform Bdp1 is supplied to the electrode 612 of the piezoelectric element 60 may be, for example, less than or equal to 5 picoliters.

Here, as described above, the drive circuit 50*a* and the drive circuit 50*b* have similar circuit configurations. Therefore, similarly to the drive circuit 50*a*, the power consumption of the drive circuit 50*b* instantaneously increases when the voltage value of the output drive signal COMB changes. Accordingly, the amount of power consumed when the trapezoidal waveform Bdp1, the voltage value of which changes more frequently than the trapezoidal waveform Adp3, is supplied to the ejection unit 600 becomes greater than any one of the amount of power consumed when the trapezoidal waveform Adp1 is supplied to the ejection unit 600, the amount of power consumed when the trapezoidal waveform Adp2 is supplied to the ejection unit 600, and the amount of power consumed when the trapezoidal waveform Adp3 is supplied to the ejection unit 600.

When supplied to the electrode 612 of the piezoelectric element 60 of the ejection unit 600, the trapezoidal waveform Bdp2 does not cause the ejection unit 600 to eject ink but causes ink near the nozzle 651 to vibrate. In other words, when the trapezoidal waveform Bdp2 is supplied to the ejection unit 600, the ejection unit 600 does not eject ink. The voltage value of the trapezoidal waveform Bdp2 starts at the voltage Vc, becomes lower than the voltage Vc, and then ends at the voltage Vc.

As described above, the drive circuit 50*b* outputs the trapezoidal waveform Bdp1 and then outputs the trapezoidal waveform Bdp2 as the drive signal COMB. Also, in the drive signal COMB output by the drive circuit 50*a*, both of the trapezoidal waveform Bdp1 and the trapezoidal waveform Bdp2 start at the voltage Vc and end at the voltage Vc. That is, the drive signal COMB output by the drive circuit 50*b* includes a signal waveform in which the trapezoidal waveform Bdp1, the trapezoidal waveform Bdp2, and the voltage Vc are arranged consecutively.

The drive signal COMA and the drive signal COMB as described above are output repeatedly at the cycle T specified by the latch signal LAT. That is, the drive signal COMA repeatedly outputs the trapezoidal waveforms Adp1, Adp2, and Adp3 at the cycle T, and the drive signal COMB repeatedly outputs the trapezoidal waveforms Bdp1 and Bdp2 at the cycle T. Here, the control circuit 100 outputs the change signal CHA that specifies the end of the period ta2 and the start of the period ta3 and the change signal CHB that specifies the end of the period tb1 and the start of the period ta2 during a period in which the drive circuit 50*a* outputs the constant voltage Vc as the drive signal COMA and the drive circuit 50*b* outputs the constant voltage Vc as the drive signal COMB. This reduces the probability that the signal waveform of the drive signal VOUT is distorted. The drive signal VOUT is generated by the drive signal selection circuit 200 described later by selecting or deselecting the drive signal COMA and by selecting or deselecting the drive signal COMB.

That is, the trapezoidal waveform Adp2 and the trapezoidal waveform Bdp1 are arranged so that the period in which the drive circuit 50*a* outputs the trapezoidal waveform Adp2 as the drive signal COMA at least partially overlaps the period in which the drive circuit 50*b* outputs the trapezoidal waveform Bdp1 as the drive signal COMB, and the trapezoidal waveform Adp3 and the trapezoidal waveform Bdp1 are arranged so that the period in which the drive circuit 50*a* outputs the trapezoidal waveform Adp3 as the drive signal COMA does not overlap the period in which the drive circuit 50*b* outputs the trapezoidal waveform Bdp1 as the drive signal COMB. Furthermore, as illustrated in FIG. 5, the trapezoidal waveform Adp1 and the trapezoidal waveform Bdp1 may be arranged so that the period in which the drive circuit 50*a* outputs the trapezoidal waveform Adp1 as the drive signal COMA at least partially overlaps the period in which the drive circuit 50*b* outputs the trapezoidal waveform Bdp1 as the drive signal COMB.

Here, the signal waveforms of the drive signals COMA and COMB illustrated in FIG. 5 are non-limiting examples, and the drive signals COMA and COMB may include signal waveforms with various shapes depending on, for example, the physical property of ink ejected by the liquid ejection head 21, the length of the cycle T of the drive signals COMA and COMB, and the conveying speed of the medium P.

4. Configuration and Operation of Selection Control Circuit

Next, a configuration and an operation of the drive signal selection circuit 200 are described. The drive signal selection circuit 200 generates the drive signal VOUT supplied to the piezoelectric element 60 of each of the multiple ejection units 600 by selecting or deselecting signal waveforms included in each of the drive signals COMA and COMB based on the clock signal SCK, the latch signal LAT, the change signals CHA and CHB, and the print data signal SI.

Figure 6:
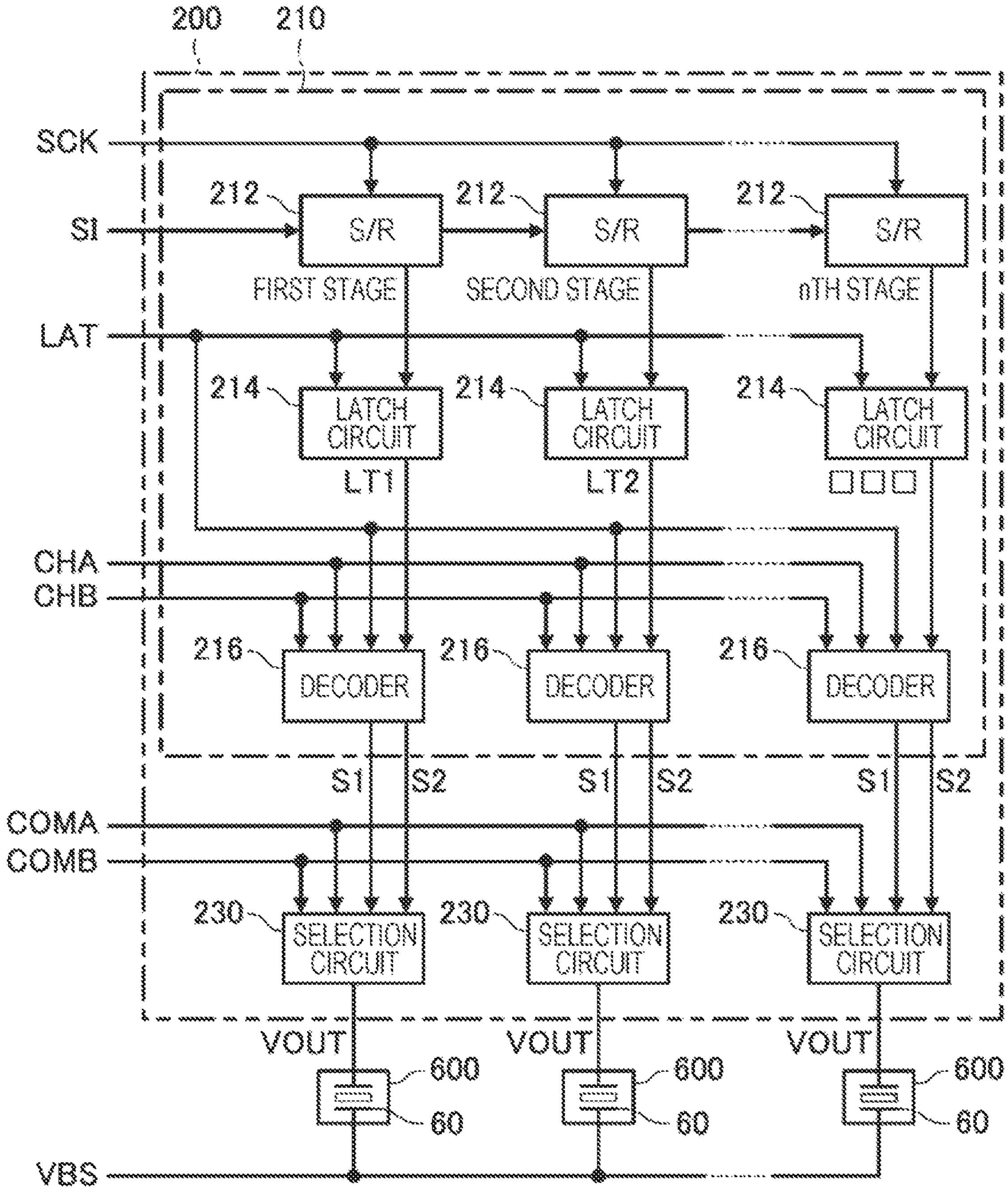
FIG. 6 is a drawing illustrating an example of a configuration of a drive signal selection circuit.

FIG. 6 is a drawing illustrating an example of a configuration of the drive signal selection circuit 200. As illustrated in FIG. 6, the drive signal selection circuit 200 includes a selection control circuit 210 and n selection circuits 230 corresponding to the n ejection units 600.

The selection control circuit 210 receives the clock signal SCK, the latch signal LAT, the change signals CHA and CHB, and the print data signal SI. The selection control circuit 210 also includes a combination of a shift register (S/R) 212, a latch circuit 214, and a decoder 216 for each of the n ejection units 600. That is, the drive signal selection circuit 200 includes n shift registers 212, n latch circuits 214, and n decoders 216.

The print data signal SI is input to the selection control circuit 210 in synchronization with the clock signal SCK. The print data signal SI includes, for the respective n ejection units 600, serially-arranged multiple sets of 3-bit print data [SIH, SIM, SIL] each of which is used to select one of "oversized dot LL", "large dot L", "medium dot M", "small dot S", and "micro vibration BSD" that indicate the sizes of dots to be formed on the medium P by ink ejected from the ejection units 600. In other words, the print data signal SI is a serial signal with 3*n* or more bits.

The multiple sets of print data [SIH, SIM, SIL] included in the print data signal SI are stored in the n shift registers 212 corresponding to the n ejection units 600. Specifically, the n shift registers 212 corresponding to the n ejection units 600 are connected to each other in a cascade, and serially-input print data signal SI is sequentially transferred to the shift registers 212 in the subsequent stages according to the clock signal SCK. Then, when the multiple sets of print data [SIH, SIM, SIL] are stored in the corresponding shift registers 212, the supply of the clock signal SCK is stopped. In other words, when the supply of the clock signal SCK is stopped, the multiples sets of print data [SIH, SIM, SIL] included in the print data signal SI are stored in the corresponding shift registers 212. In FIG. 6, to distinguish the n shift register 212, stage numbers "first stage", "second stage", . . . , and "nth stage" are sequentially assigned to the n shift registers 212 from the upstream end toward the downstream end of the flow of the print data signal SI.

The n latch circuits 214 simultaneously latch the multiple sets of print data [SIH, SIM, SIL] stored in the corresponding shift registers 212 at the rise of the latch signal LAT. The multiple sets of print data [SIH, SIM, SIL] latched by the latch circuits 214 are input to the corresponding decoders 216.

Figures 7, 8:
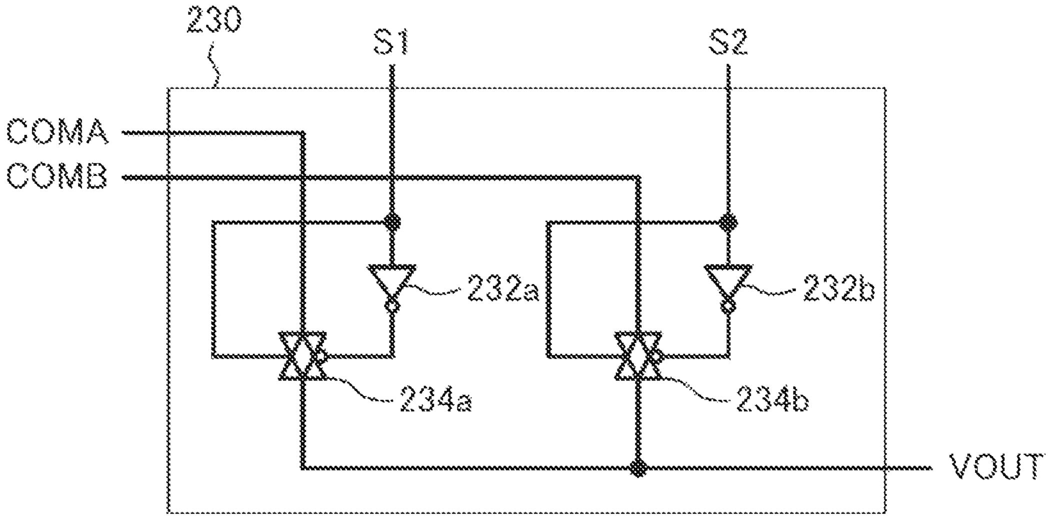
FIG. 7 is a table showing an example of information decoded by a decoder.
FIG. 8 is a drawing illustrating an example of a configuration of a selection circuit corresponding to one ejection unit.

FIG. 7 is a table showing an example of information decoded by the decoder 216. The decoder 216 outputs selection signals S1 and S2 with logic levels corresponding to the input print data [SIH, SIM, SIL]. Specifically, when the print data [SIH, SIM, SIL]=[0, 1, 0] is input to the decoder 216, the decoder 216 outputs a selection signal S1 that becomes the low (L) level in the period ta1, becomes the high (H) level in the period ta2, and becomes the L level in the period ta3 and a selection signal S2 that becomes the L level in the period tb1 and becomes the L level in the period tb2.

The selection signals S1 and S2 output by the decoder 216 are input to the selection circuit 230. The selection circuit 230 is provided for each of the n ejection units 600. That is, the drive signal selection circuit 200 includes n selection circuits 230 corresponding to the n ejection units 600. FIG. 8 is a drawing illustrating an example of a configuration of the selection circuit 230 corresponding to one ejection unit 600. As illustrated in FIG. 8, the selection circuit 230 includes inverters 232*a* and 232*b*, which are NOT circuits, and transfer gates 234*a* and 234*b*.

The selection signal S1 is input to the positive control terminal of the transfer gate 234*a* not marked with a circle and is also input to the negative control terminal of the transfer gate 234*a* marked with a circle after its logic level is inverted by the inverter 232*a*. Also, the drive signal COMA is supplied to the input terminal of the transfer gate 234*a*. The transfer gate 234*a* electrically connects the input terminal and the output terminal to each other when a H-level selection signal S1 is input and electrically disconnects the input terminal and the output terminal from each other when a L-level selection signal S1 is input. That is, the transfer gate 234*a* outputs a signal waveform included in the drive signal COMA from the output terminal when the logic level of the input selection signal S1 is the H level, and outputs no signal waveform included in the drive signal COMA from the output terminal when the logic level of the input selection signal S1 is the L level.

The selection signal S2 is input to the positive control terminal of the transfer gate 234*b* not marked with a circle and is also input to the negative control terminal of the transfer gate 234*b* marked with a circle after its logic level is inverted by the inverter 232*b*. Also, the drive signal COMB is supplied to the input terminal of the transfer gate 234*b*. The transfer gate 234*b* electrically connects the input terminal and the output terminal to each other when a H-level selection signal S2 is input and electrically disconnects the input terminal and the output terminal from each other when a L-level selection signal S2 is input. That is, the transfer gate 234*b* outputs a signal waveform included in the drive signal COMB from the output terminal when the logic level of the input selection signal S2 is the H level and outputs no signal waveform included in the drive signal COMB from the output terminal when the logic level of the input selection signal S2 is the L level.

The output terminal of the transfer gate 234*a* and the output terminal of the transfer gate 234*b* are connected to a common connection point, and the drive signal selection circuit 200 outputs a signal at the connection point as the drive signal VOUT.

Figure 9:
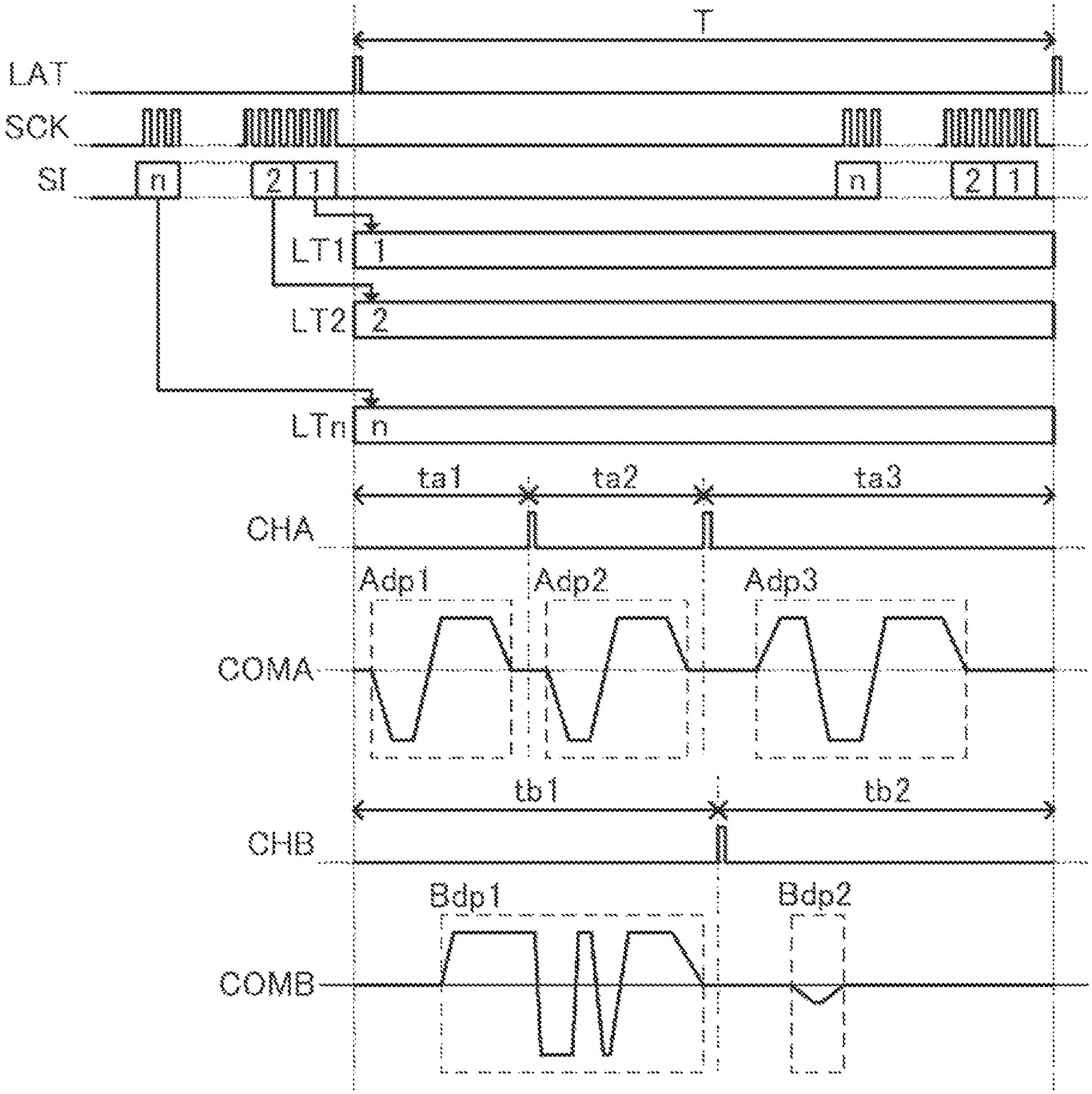
FIG. 9 is a drawing for describing an operation of a drive signal selection circuit.

Here, an operation of the drive signal selection circuit 200 is described with reference to FIG. 9. FIG. 9 is a drawing for describing an operation of the drive signal selection circuit 200. The print data signal SI is input to the selection control circuit 210 as a serial signal synchronized with the clock signal SCK. Then, the print data signal SI is sequentially transferred through the n shift registers 212 corresponding to the n ejection units 600 in synchronization with the clock signal SCK. When the input of the clock signal SCK is stopped, multiple sets of print data [SIH, SIM, SIL] corresponding to the n ejection units 600 are stored in the shift registers 212. The print data signal SI includes the multiple sets of print data [SIH, SIM, SIL] in the order of the ejection units 600 corresponding to the order of the nth stage, . . . , 2nd stage, and 1st stage shift registers 212.

Then, when the latch signal LAT rises, the latch circuits 214 simultaneously latch the multiple sets of print data [SIH, SIM, SIL] stored in the shift registers 212. The multiple sets of print data [SIH, SIM, SIL] latched by the latch circuits 214 are input to the corresponding decoders 216. Here, LT1, LT2, . . . , and LTn in FIG. 9 correspond to the multiple sets of print data [SIH, SIM, SIL] latched by the latch circuits 214 corresponding to the 1st stage, 2nd stage, . . . , and nth stage shift registers 212.

Each decoder 216 decodes the input print data [SIH, SIM, SIL] to generate the selection signals S1 and S2 with logic levels as shown in FIG. 7 and outputs the selection signals S1 and S2 to the corresponding selection circuit 230. Then, the selection circuit 230 generates the drive signal VOUT for the corresponding ejection unit 600 among the n ejection units 600 by selecting or deselecting the signal waveforms included in the drive signals COMA and COMB according to the logic levels of the selection signals S1 and S2 output by the decoder 216, and outputs the drive signal VOUT to the corresponding ejection unit 600.

Figure 10:
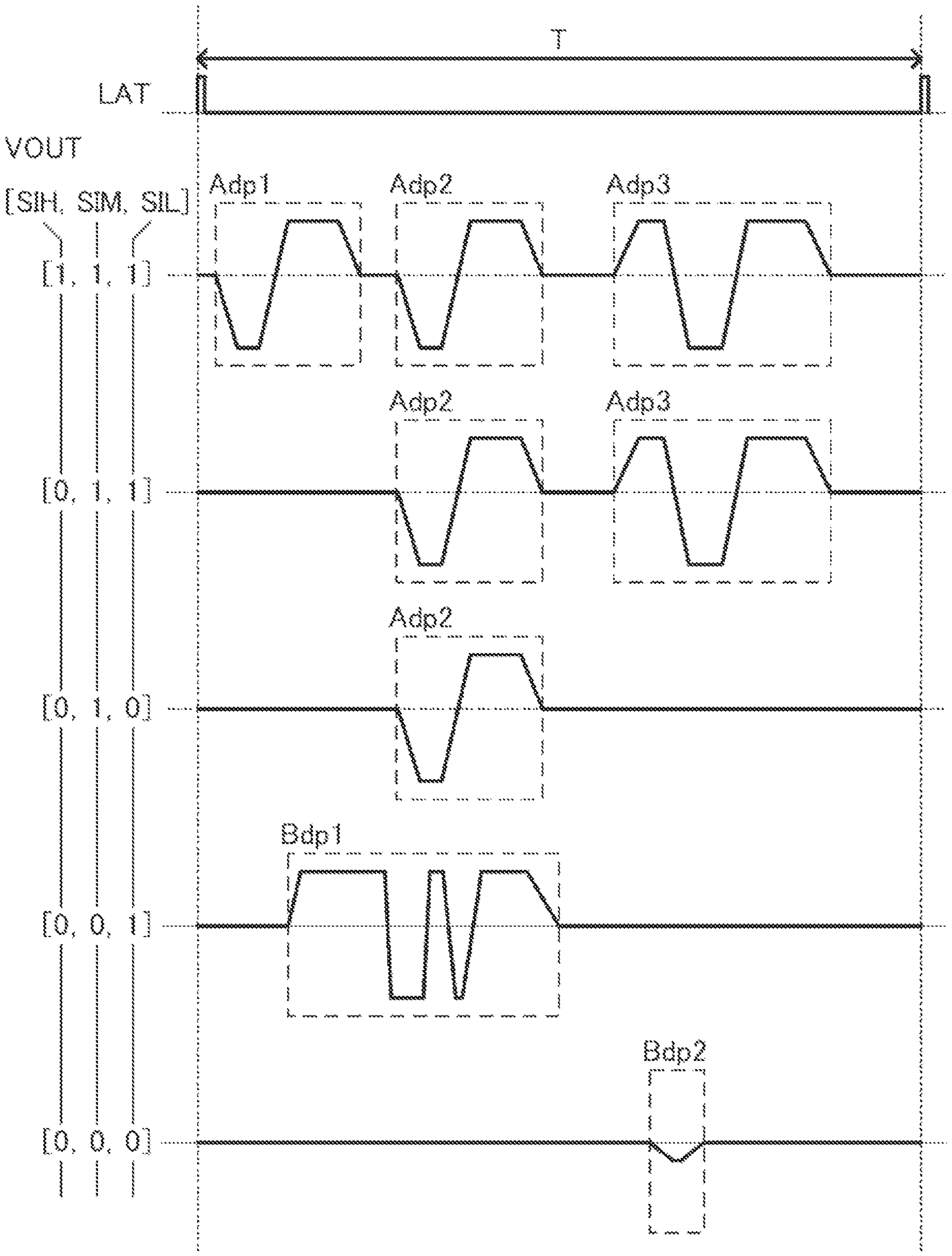
FIG. 10 is a drawing showing a relationship between print data [SIH, SIM, SIL] and a drive signal VOUT.

FIG. 10 is a drawing showing a relationship between the print data [SIH, SIM, SIL] and the drive signal VOUT. As illustrated in FIG. 10, when the print data the [SIH, SIM, SIL]=[1, 1, 1] is input to the decoder 216, the decoder 216 outputs the selection signal S1 that becomes H, H, and H levels in the periods ta1, ta2, and ta3 and the selection signal S2 that becomes L and L levels in the periods tb1 and tb2. As a result, the selection circuit 230 outputs the drive signal VOUT in which the trapezoidal waveform Adp1, the trapezoidal waveform Adp2, and the trapezoidal waveform Adp3 are consecutively arranged. When the drive signal VOUT in which the trapezoidal waveform Adp1, the trapezoidal waveform Adp2, and the trapezoidal waveform Adp3 are consecutively arranged is supplied to the electrode 612 of the piezoelectric element 60 of the corresponding ejection unit 600, the ejection unit 600 ejects an amount of ink greater than the predetermined amount, an amount of ink greater than the predetermined amount, and the predetermined amount of ink as ink droplets. When the ink droplets ejected from the ejection unit 600 land on the medium P and join together, an oversized dot LL is formed on the medium P.

When the print data [SIH, SIM, SIL]=[0, 1, 1] is input to the decoder 216, the decoder 216 outputs the selection signal S1 that becomes L, H, and H levels in the periods ta1, ta2, and ta3 and the selection signal S2 that becomes L and L levels in the periods tb1 and tb2. As a result, the selection circuit 230 outputs the drive signal VOUT in which the trapezoidal waveform Adp2 and the trapezoidal waveform Adp3 are consecutively arranged. When the drive signal VOUT in which the trapezoidal waveform Adp2 and the trapezoidal waveform Adp3 are consecutively arranged is supplied to the electrode 612 of the piezoelectric element 60 of the corresponding ejection unit 600, the ejection unit 600 ejects an amount of ink greater than the predetermined amount and the predetermined amount of ink as ink droplets. When the ink droplets ejected from the ejection unit 600 land on the medium P and join together, a large dot L is formed on the medium P.

When the print data [SIH, SIM, SIL]=[0, 1, 0] is input to the decoder 216, the decoder 216 outputs the selection signal S1 that becomes L, H, and L levels in the periods ta1, ta2, and ta3 and the selection signal S2 that becomes L and L levels in the periods tb1 and tb2. As a result, the selection circuit 230 outputs the trapezoidal waveform Adp2 as the drive signal VOUT. When the trapezoidal waveform Adp2 is supplied as the drive signal VOUT to the electrode 612 of the piezoelectric element 60 of the corresponding ejection unit 600, the ejection unit 600 outputs the predetermined amount of ink as an ink droplet. When the ink droplet ejected from the ejection unit 600 lands on the medium P, a medium dot M is formed on the medium P.

When the print data [SIH, SIM, SIL]=[0, 0, 1] is input to the decoder 216, the decoder 216 outputs the selection signal S1 that becomes L, L, and L levels in the periods ta1, ta2, and ta3 and the selection signal S2 that becomes H and L levels in the periods tb1 and tb2. As a result, the selection circuit 230 outputs the trapezoidal waveform Bdp1 as the drive signal VOUT. When the trapezoidal waveform Bdp1 is supplied as the drive signal VOUT to the electrode 612 of the piezoelectric element 60 of the corresponding ejection unit 600, the ejection unit 600 ejects an amount of ink less than the predetermined amount as an ink droplet. When the ink droplet ejected from the ejection unit 600 lands on the medium P, a small dot S is formed on the medium P.

When the print data [SIH, SIM, SIL]=[0, 0, 0] is input to the decoder 216, the decoder 216 outputs the selection signal S1 that becomes L, L, and L levels in the periods ta1, ta2, and ta3 and the selection signal S2 that becomes L and H levels in the periods tb1 and tb2. As a result, the selection circuit 230 outputs the trapezoidal waveform Bdp2 as the drive signal VOUT. When the trapezoidal waveform Bdp2 is supplied as the drive signal VOUT to the electrode 612 of the piezoelectric element 60 of the corresponding ejection unit 600, the ejection unit 600 does not output ink but performs the micro vibration BSD.

As described above, the drive signal selection circuit 200 generates drive signals VOUT corresponding to "oversized dot LL", "large dot L", "medium dot M", "small dot S", and "micro vibration BSD" by selecting or deselecting signal waveforms in the drive signals COMA and COMB based on the print data signal SI, and supplies the drive signals VOUT to multiple piezoelectric elements 60.

5. Example of Multi-Gradation Expression

Figure 11:
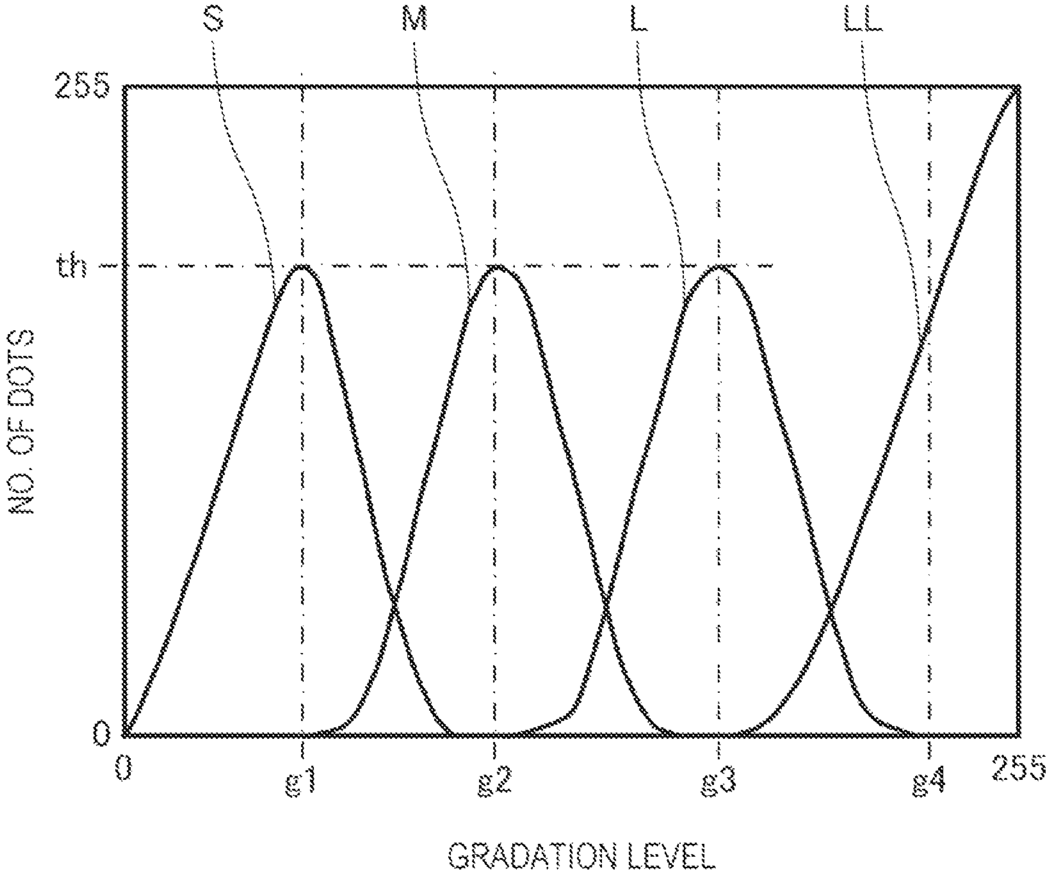
FIG. 11 is a graph showing a relationship between the size and number of dots to be formed and a gradation level in a predetermined gradation range.

The liquid ejecting apparatus 1 configured as described above performs multi-gradation expression by changing the sizes and the number of dots formed on the medium P. FIG. 11 is a graph showing a relationship between the size and number of dots to be formed and a gradation level in a predetermined gradation range. The horizontal axis in FIG. 11 indicates a gradation level in multi-gradation expression to be formed in a predetermined gradation range by using a scale of 256 levels (0 to 255). The vertical axis in FIG. 11 indicates a dot amount formed in the predetermined gradation range by using a scale of 256 levels (0 to 255). Here, the predetermined gradation range corresponds to a range where pixels, in which dots are to be formed, are formed on a matrix. A dot amount of "0" indicates that dots are formed in none of pixels in the predetermined gradation range, a dot amount of "128" indicates that dots are formed in about one half of the pixels in the predetermined gradation range, and a dot amount of "255" indicates that dots are formed in all of the pixels in the predetermined gradation range.

As illustrated in FIG. 11, when the gradation level of the medium P is "0", no dot is formed in the predetermined gradation range of the medium P. As the gradation level of the medium P increases, the number of small dots S formed in the predetermined gradation range of the medium P increases. Also, when the number of small dots S formed in the predetermined gradation range of the medium P reaches a predetermined threshold th, the number of small dots S formed in the predetermined gradation range of the medium P starts to decrease along with the increase in the gradation level of the medium P, and medium dots M start to be formed in the predetermined gradation range of the medium P. In the descriptions below, a gradation level at which the number of small dots S formed in the predetermined gradation range of the medium P starts to decrease and medium dots M start to be formed may be referred to as "g1".

Subsequently, when the number of medium dots M formed in the predetermined gradation range of the medium P reaches the predetermined threshold th along with the increase in the gradation level of the medium P, the number of medium dots M formed in the predetermined gradation range of the medium P starts to decrease along with the increase in the gradation level of the medium P, and the large dots L start to be formed in the predetermined gradation range of the medium P. In the descriptions below, a gradation level at which the number of medium dots M formed in the predetermined gradation range of the medium P starts to decrease and large dots L start to be formed may be referred to as "g2".

Subsequently, when the number of large dots L formed in the predetermined gradation range of the medium P reaches the predetermined threshold th along with the increase in the gradation level of the medium P, the number of large dots L formed in the predetermined gradation range of the medium P starts to decrease along with the increase in the gradation level of the medium P, and oversized dots LL start to be formed in the predetermined gradation range of the medium P. In the descriptions below, a gradation level at which the number of large dots L formed in the predetermined gradation range of the medium P starts to decrease and oversized dots LL start to be formed may be referred to as "g3".

Subsequently, when the number of oversized dots LL formed in the predetermined gradation range of the medium P increases along with the increase in the gradation level of the medium P and the gradation level reaches "g4", all dots formed in the predetermined gradation range of the medium P become oversized dots LL. Then, when the gradation level becomes "255", all dots in the predetermined gradation range of the medium P become oversized dots LL.

As described above, the liquid ejecting apparatus 1 uses only the drive signal VOUT corresponding to the small dot S to express gradation in a range of gradation levels from "0" to "g1". That is, the liquid ejecting apparatus 1 uses only the trapezoidal waveform Bdp1 to express gradation in the range of gradation levels from "0" to "g1".

Also, the liquid ejecting apparatus 1 uses the drive signal VOUT corresponding to the small dot S and the drive signal VOUT corresponding to the medium dot M to express gradation in the range of gradation levels from “g1” to “g2” in which brightness is lower than the brightness in the range of gradation levels from “0” to “g1”. That is, the liquid ejecting apparatus 1 uses the trapezoidal waveform Bdp1 and the trapezoidal waveform Adp3 to express gradation in the range of gradation levels from “g1” to “g2”.

Also, the liquid ejecting apparatus 1 uses the drive signal VOUT corresponding to the medium dot M and the drive signal VOUT corresponding to the large dot L to express gradation in the range of gradation levels from “g2” to “g3” in which brightness is lower than the brightness in the range of gradation levels from “0” to “g2”. That is, the liquid ejecting apparatus 1 uses the trapezoidal waveform Adp2 and the trapezoidal waveform Adp3 to express gradation in the range of gradation levels from “g2” to “g3”.

Also, the liquid ejecting apparatus 1 uses the drive signal VOUT corresponding to the large dot L and the drive signal VOUT corresponding to the oversized dot LL to express gradation in the range of gradation levels from “g3” to “g4” in which brightness is lower than the brightness in the range of gradation levels from “0” to “g3”. That is, the liquid ejecting apparatus 1 uses the trapezoidal waveform Adp1, the trapezoidal waveform Adp2, and the trapezoidal waveform Adp3 to express gradation in the range of gradation levels from “g3” to “g4”.

Also, the liquid ejecting apparatus 1 uses only the drive signal VOUT corresponding to the oversized dot LL to express gradation in the range of gradation levels from “g4” to “255” in which brightness is lower than the brightness in the range of gradation levels from “0” to “g4”. That is, the liquid ejecting apparatus 1 uses the trapezoidal waveform Adp1, the trapezoidal waveform Adp2, and the trapezoidal waveform Adp3 to express gradation in the range of gradation levels from “g4” to “255”.

As described above, the liquid ejecting apparatus 1 of the present embodiment drives the piezoelectric element 60 by using the drive signal VOUT for forming the small dot S with a small dot size on the medium P and does not drive the piezoelectric element 60 by using the drive signal VOUT for forming the oversized dot LL with a large dot size on the medium P when the gradation level of an image formed on the medium P is low, i.e., when the brightness value of the image is high. Also, the liquid ejecting apparatus 1 drives the piezoelectric element 60 by using the drive signal VOUT for forming the oversized dot LL with a large dot size on the medium P and does not drive the piezoelectric element 60 by using the drive signal VOUT for forming the small dot S with a small dot size on the medium P when the gradation level of an image formed on the medium P is high, i.e., when the brightness value of the image is low. This reduces the probability that dots with very different sizes are formed in the predetermined gradation range of the medium P when the liquid ejecting apparatus 1 performs multi-gradation expression in the predetermined gradation range. This in turn improves the quality of multi-gradation expression formed on the medium P.

Here, the cycle T is an example of a drive cycle, the drive signal COMA is an example of a first drive signal, the drive signal COMB is an example of a second drive signal, the drive circuit 50*a* that outputs the drive signal COMA is an example of a first drive circuit, and the drive circuit 50*b* that outputs the drive signal COMB is an example of a second drive circuit. Also, the trapezoidal waveform Adp1 included in the drive signal COMA is an example of a first drive waveform, the trapezoidal waveform Adp2 included in the drive signal COMA is an example of a second drive waveform, the trapezoidal waveform Adp3 included in the drive signal COMA is an example of a third drive waveform, the trapezoidal waveform Bdp1 included in the drive signal COMB is an example of a fourth drive waveform, and the trapezoidal waveform Bdp2 included in the drive signal COMB is an example of a fifth drive waveform. Also, the amount of ink that is greater than the predetermined amount and is ejected by the ejection unit 600 when the trapezoidal waveform Adp1 is supplied to the ejection unit 600 is an example of a first droplet volume, the amount of ink that is greater than the predetermined amount and is ejected by the ejection unit 600 when the trapezoidal waveform Adp2 is supplied to the ejection unit 600 is an example of a second droplet volume, the amount of ink that equals the predetermined amount and is ejected by the ejection unit 600 when the trapezoidal waveform Adp3 is supplied to the ejection unit 600 is an example of a third droplet volume, and the amount of ink that is less than the predetermined amount and is ejected by the ejection unit 600 when the trapezoidal waveform Bdp1 is supplied to the ejection unit 600 is an example of a fourth droplet volume. Also, any of the gradation levels from [0] to [g1] expressed by using only the trapezoidal waveform Bdp1 is an example of a first gradation level, any of the gradation levels from [g2] to [g3] that has a brightness value lower than the brightness value of a gradation level corresponding to the first gradation level and is expressed by using the trapezoidal waveform Adp2 and without using the trapezoidal waveform Adp1 and the trapezoidal waveform Bdp1 is an example of a second gradation level, any of the gradation levels from [g3] to [255] that has a brightness value lower than the brightness value of a gradation level corresponding to the second gradation level and is expressed by using the trapezoidal waveform Adp1 and without using the trapezoidal waveform Bdp1 is an example of a third gradation level, and any of the gradation levels from [g2] to [g4] that has a brightness value lower than the brightness value of a gradation level corresponding to the second gradation level and higher than the brightness value of a gradation level corresponding to the third gradation level and is expressed by using the trapezoidal waveform Adp2 and one of the trapezoidal waveform Adp1 and the trapezoidal waveform Adp3 and without using the trapezoidal waveform Bdp1 is an example of a fourth gradation level.

6. Effects

In the liquid ejecting apparatus 1 configured as described above, the amount of ink ejected by the ejection unit 600 when the trapezoidal waveform Bdp1 is supplied to the ejection unit 600 is less than the amount of ink ejected by the ejection unit 600 when the trapezoidal waveform Adp1 is supplied to the ejection unit 600, the amount of ink ejected by the ejection unit 600 when the trapezoidal waveform Adp2 is supplied to the ejection unit 600, and the amount of ink ejected by the ejection unit 600 when the trapezoidal waveform Adp3 is supplied to the ejection unit 600; and the amount of ink ejected by the ejection unit 600 when the trapezoidal waveform Adp3 is supplied to the ejection unit 600 is less than the amount of ink ejected by the ejection unit 600 when the trapezoidal waveform Adp1 is supplied to the ejection unit 600 and the amount of ink ejected by the ejection unit 600 when the trapezoidal waveform Adp2 is supplied to the ejection unit 600. Therefore, the number of changes of the voltage value in the trapezoidal waveform Bdp1 is greater than the number of changes of the voltage value in each of the trapezoidal waveforms Adp1, Adp2 and Adp3; and the number of changes of the voltage value in the trapezoidal waveform Adp3 is greater than the number of changes of the voltage value in each of the trapezoidal waveforms Adp1 and Adp2. Accordingly, the amount of power consumed when the trapezoidal waveform Bdp1 is supplied to the ejection unit 600 is greater than the amount of power consumed when the trapezoidal waveform Adp1 is supplied to the ejection unit 600, the amount of power consumed when the trapezoidal waveform Adp2 is supplied to the ejection unit 600, and the amount of power consumed when the trapezoidal waveform Adp3 is supplied to the ejection unit 600; and the amount of power consumed when the trapezoidal waveform Adp3 is supplied to the ejection unit 600 is greater than the amount of power consumed when the trapezoidal waveform Adp1 is supplied to the ejection unit 600 and the amount of power consumed when the trapezoidal waveform Adp2 is supplied to the ejection unit 600.

In the liquid ejecting apparatus 1 as described above, the period in which the drive circuit 50*a* outputs the trapezoidal waveform Adp3 as the drive signal COMA and the period in which the drive circuit 50*b* outputs the trapezoidal waveform Bdp1 as the drive signal COMB do not overlap each other. This reduces the probability that the power consumption instantaneously increases when the drive signal COMA and the drive signal COMB are supplied to the ejection unit 600 as the drive signal VOUT.

Furthermore, the period in which the drive circuit 50*a* outputs the trapezoidal waveform Adp2 as the drive signal COMA at least partially overlaps the period in which the drive circuit 50*b* outputs the trapezoidal waveform Bdp1 as the drive signal COMB. This makes it possible to reduce the time necessary for the transmission of the drive signals COMA and COMB. This also reduces the probability that the ejection rate of ink in the liquid ejecting apparatus 1 decreases.

The embodiments and variations of the present disclosure are described above. However, the present disclosure is not limited to the above-described embodiments and variations and may be implemented in various manners without departing from the spirit of the present disclosure. For example, the above embodiments may be combined in any appropriate manner.

The present disclosure includes configurations that are substantially the same as the configurations described in the embodiments (e.g., a configuration the functions, methods, and results of which are the same as those of the above embodiments, or a configuration the purpose and effects of which are the same as those of the above embodiments). Also, the present disclosure includes a configuration obtained by replacing non-essential components of a configuration described in the embodiments. Also, the present disclosure includes a configuration that can provide the same effect or achieve the same purpose as that provided or achieved by a configuration described in the embodiments. Furthermore, the present disclosure includes a configuration obtained by adding a known technology to a configuration described in the embodiments.

The following configurations can be derived from the embodiments described above.

A liquid ejecting apparatus according to an embodiment performs gradation expression with multiple gradation levels by ejecting liquid droplets onto a medium and includes a first drive circuit that outputs a first drive signal; a second drive circuit that outputs a second drive signal; an ejection unit that ejects a liquid in response to receiving at least one of the first drive signal and the second drive signal; and a power circuit that supplies power to the first drive circuit and the second drive circuit. The first drive signal includes a first drive waveform, a second drive waveform, and a third drive waveform in a drive cycle; the second drive signal includes a fourth drive waveform and a fifth drive waveform in the drive cycle; when receiving the first drive waveform, the ejection unit ejects a liquid droplet with a first droplet volume; when receiving the second drive waveform, the ejection unit ejects a liquid droplet with a second droplet volume; when receiving the third drive waveform, the ejection unit ejects a liquid droplet with a third droplet volume; when receiving the fourth drive waveform, the ejection unit ejects a liquid droplet with a fourth droplet volume; when receiving the fifth drive waveform, the ejection unit ejects no liquid droplet; the fourth droplet volume is less than the first droplet volume, the second droplet volume, and the third droplet volume; the third droplet volume is less than the first droplet volume and the second droplet volume; a first gradation level in the multiple gradation levels is expressed by using only the fourth drive waveform; a second gradation level in the multiple gradation levels is expressed by using at least the second drive waveform and without using the first drive waveform and the fourth drive waveform; a third gradation level in the multiple gradation levels is expressed by using at least the first drive waveform and without using the fourth drive waveform; a brightness value of the second gradation level is lower than a brightness value of the first gradation level; a brightness value of the third gradation level is lower than the brightness value of the second gradation level; a period in which the first drive circuit outputs the second drive waveform as the first drive signal at least partially overlaps a period in which the second drive circuit outputs the fourth drive waveform as the second drive signal; a period in which the first drive circuit outputs the third drive waveform as the first drive signal does not overlap the period in which the second drive circuit outputs the fourth drive waveform as the second drive signal; and in the drive cycle, the first drive circuit outputs the first drive waveform as the first drive signal, subsequently outputs the second drive waveform as the first drive signal, and then outputs the third drive waveform as the first drive signal.

With this liquid ejecting apparatus, because the period in which the first drive circuit outputs the third drive waveform, which causes ejection of a small amount of liquid and therefore consumes a large amount of power, as the first drive signal does not overlap the period in which the second drive circuit outputs the fourth drive waveform, which causes ejection of a small amount of liquid and therefore consumes a large amount of power, as the second drive signal, the probability of an instantaneous increase in power consumption is reduced.

Also, with this liquid ejecting apparatus, the period in which the first drive circuit outputs the second drive waveform as the first drive signal at least partially overlaps the period in which the second drive circuit outputs the fourth drive waveform as the second drive signal. This reduces the probability that the drive cycle of the drive signals COMA and COMB becomes longer and thereby reduces the probability that the ejection rate of liquid droplets by the liquid ejecting apparatus decreases.

In the liquid ejecting apparatus according to an embodiment, the fourth droplet volume may be less than or equal to 5 picoliters.

With this liquid ejecting apparatus, the probability of an instantaneous increase in power consumption is low even when the amount of liquid ejected in response to the supply of the fourth drive waveform is as small as 5 picoliters or less.

In the liquid ejecting apparatus according to an embodiment, power consumed when the fourth drive waveform is supplied to the ejection unit may be greater than power consumed when the first drive waveform is supplied to the ejection unit, power consumed when the second drive waveform is supplied to the ejection unit, and power consumed when the third drive waveform is supplied to the ejection unit.

With this liquid ejecting apparatus, the period in which the first drive circuit outputs the second drive waveform as the first drive signal at least partially overlaps the period in which the second drive circuit outputs the fourth drive waveform as the second drive signal. This reduces the probability that the drive cycle of the drive signals COMA and COMB becomes longer and thereby reduces the probability that the ejection rate of liquid droplets by the liquid ejecting apparatus decreases.

In the liquid ejecting apparatus according to an embodiment, a period in which the first drive circuit outputs the first drive waveform as the first drive signal at least partially overlaps the period in which the second drive circuit outputs the fourth drive waveform as the second drive signal, and the power consumed when the first drive waveform is supplied to the ejection unit may be less than the power consumed when the third drive waveform is supplied to the ejection unit.

With this liquid ejecting apparatus, the period in which the first drive circuit outputs the first drive waveform as the first drive signal at least partially overlaps the period in which the second drive circuit outputs the fourth drive waveform as the second drive signal. This reduces the probability that the drive cycle of the drive signals COMA and COMB becomes longer and thereby reduces the probability that the ejection rate of liquid droplets by the liquid ejecting apparatus decreases.

In the liquid ejecting apparatus according an embodiment, a fourth gradation level in the multiple gradation levels is expressed by using the second drive waveform and one of the first drive waveform and the third drive waveform and without using the fourth drive waveform, and a brightness value of the fourth gradation level may be lower than the brightness value of the second gradation level and higher than the brightness value of the third gradation level.

In the liquid ejecting apparatus according to an embodiment, power consumed when the fourth drive waveform is supplied to the ejection unit may be greater than power consumed when the third drive waveform is supplied to the ejection unit; and the power consumed when the third drive waveform is supplied to the ejection unit may be greater than power consumed when the first drive waveform is supplied to the ejection unit and power consumed when the second drive waveform is supplied to the ejection unit.

What is claimed is:

1. A liquid ejecting apparatus that performs gradation expression with multiple gradation levels by ejecting liquid droplets onto a medium, the liquid ejecting apparatus comprising:

a first drive circuit that outputs a first drive signal;

a second drive circuit that outputs a second drive signal;

an ejection unit that ejects a liquid in response to receiving at least one of the first drive signal and the second drive signal; and a power circuit that supplies power to the first drive circuit and the second drive circuit, wherein the first drive signal includes a first drive waveform, a second drive waveform, and a third drive waveform in a drive cycle, the second drive signal includes a fourth drive waveform and a fifth drive waveform in the drive cycle, when receiving the first drive waveform, the ejection unit ejects a liquid droplet with a first droplet volume, when receiving the second drive waveform, the ejection unit ejects a liquid droplet with a second droplet volume, when receiving the third drive waveform, the ejection unit ejects a liquid droplet with a third droplet volume, when receiving the fourth drive waveform, the ejection unit ejects a liquid droplet with a fourth droplet volume, when receiving the fifth drive waveform, the ejection unit ejects no liquid droplet, the fourth droplet volume is less than the first droplet volume, the second droplet volume, and the third droplet volume, the third droplet volume is less than the first droplet volume and the second droplet volume, a first gradation level in the multiple gradation levels is expressed by using only the fourth drive waveform, a second gradation level in the multiple gradation levels is expressed by using at least the second drive waveform and without using the first drive waveform and the fourth drive waveform, a third gradation level in the multiple gradation levels is expressed by using at least the first drive waveform and without using the fourth drive waveform, a fourth gradation level in the multiple gradation levels is expressed by using the second drive waveform and one of the first drive waveform and the third drive waveform and without using the fourth drive waveform, a brightness value of the second gradation level is lower than a brightness value of the first gradation level, a brightness value of the third gradation level is lower than the brightness value of the second gradation level, a brightness value of the fourth gradation level is lower than the brightness value of the second gradation level and higher than the brightness value of the third gradation level, a period in which the first drive circuit outputs the second drive waveform as the first drive signal at least partially overlaps a period in which the second drive circuit outputs the fourth drive waveform as the second drive signal, a period in which the first drive circuit outputs the third drive waveform as the first drive signal does not overlap the period in which the second drive circuit outputs the fourth drive waveform as the second drive signal, and in the drive cycle, the first drive circuit outputs the first drive waveform as the first drive signal, subsequently outputs the second drive waveform as the first drive signal, and then outputs the third drive waveform as the first drive signal.

2. The liquid ejecting apparatus according to claim 1, wherein the fourth droplet volume is less than or equal to 5 picoliters.

3. The liquid ejecting apparatus according to claim 1, wherein power consumed when the fourth drive waveform is supplied to the ejection unit is greater than power consumed when the first drive waveform is supplied to the ejection unit, power consumed when the second drive waveform is supplied to the ejection unit, and power consumed when the third drive waveform is supplied to the ejection unit.

4. The liquid ejecting apparatus according to claim 1, wherein a period in which the first drive circuit outputs the first drive waveform as the first drive signal at least partially overlaps the period in which the second drive circuit outputs the fourth drive waveform as the second drive signal, and power consumed when the first drive waveform is supplied to the ejection unit is less than power consumed when the third drive waveform is supplied to the ejection unit.

5. The liquid ejecting apparatus according to claim 1, wherein power consumed when the fourth drive waveform is supplied to the ejection unit is greater than power consumed when the third drive waveform is supplied to the ejection unit, and the power consumed when the third drive waveform is supplied to the ejection unit is greater than power consumed when the first drive waveform is supplied to the ejection unit and power consumed when the second drive waveform is supplied to the ejection unit.

* * * * *